June 23, 1970     W. D. BEAVER     3,517,350

ENERGY TRANSLATING DEVICE

Original Filed Oct. 28, 1966     4 Sheets-Sheet 1

INVENTOR
W. D. BEAVER

BY Leo Stanger

ATTORNEY

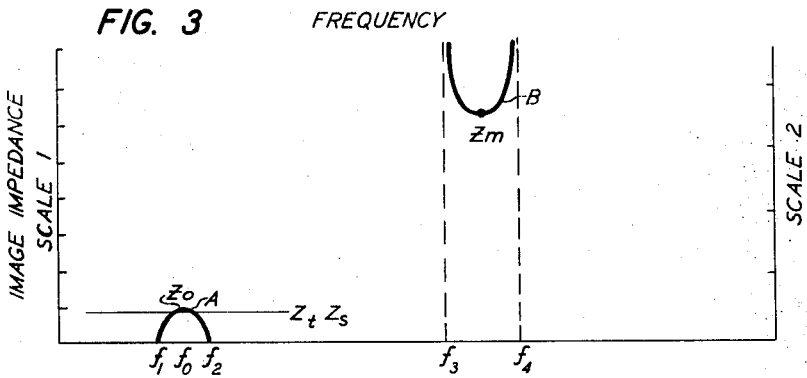
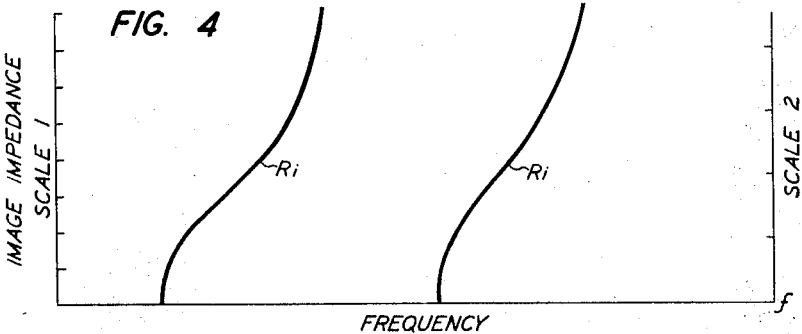
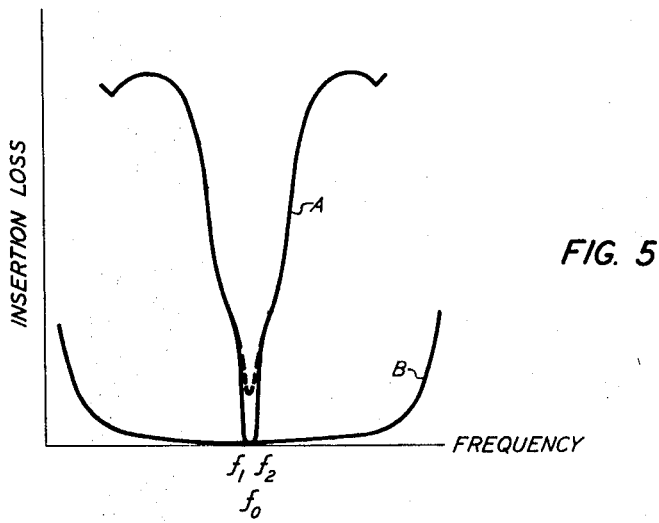
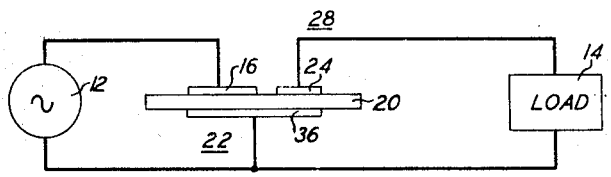

United States Patent Office 3,517,350
Patented June 23, 1970

3,517,350
ENERGY TRANSLATING DEVICE
William D. Beaver, Center Valley, Pa., assignor to Bell Telephone Laboratories, Incorporated, Murray Hill and Berkeley Heights, N.J., a corporation of New York
Continuation of application Ser. No. 590,264, Oct. 28, 1966. This application July 7, 1969, Ser. No. 845,635
Int. Cl. H03h 9/20, 7/38
U.S. Cl. 333—72          10 Claims

ABSTRACT OF THE DISCLOSURE

In narrow band crystal filters having two or more acoustically coupled electrode pairs wherein the electrodes have sufficient masses to decrease the coupling below a given value, inharmonic modes are suppressed by making the electrode of one pair different in area from electrodes of the other pair. Energy loss due to impedance mismatch is also avoided by dimensioning the electrode pairs differently.

---

This is a continuation of the copending application of W. D. Beaver, Ser. No. 590,264 filed Oct. 28, 1966 for Energy Translating Device, now abandoned.

This invention relates to energy transfer devices particularly of the type disclosed in applications Ser. No. 541,549, filed Apr. 11, 1966 and Ser. No. 558,338, filed June 17, 1966, both of W. D. Beaver and R. A. Sykes, wherein selective low loss transmission of energy between respective energy paths is achieved, through acoustically resonant crystal wafers, by mass loading the opposite faces of a crystal wafer with a number of spaced plate pairs that form resonators and concentrate the wafer thickness vibation between the plates of each pair, and by spacing the resonators so that predetermined portions of the vibrations of one resonator affect the other.

The invention is also directed toward a specific aspect of the above applications, namely a monolithic filter. According to that aspect a wave filter is formed by vapor-depositing two identical pairs of gold piezoelectric electrodes on opposite faces of a quartz wafer and connecting the respective pairs to a source and a load. In this environment the electrode pairs on the wafer form respective resonators. According to an aspect of the above applications the electrodes have sufficient mass and the pairs are spaced far enough apart so that the coupling between the resonators is small enough to overlap the respective resonators' resonant-to-antiresonant frequency ranges, and hence to overcome the effects of stray capacitances of the electrodes. The filter then forms two passbands. The lower band has a real image impedance characteristic over a low impedance range that starts and ends at zero and rises to an intermediate maximum. The higher band has a real image impedance characteristic in a high impedance range that descends from infinity to an intermediate minimum and returns to infinity. By making the electrode masses and distances great enough, the coupling is small enough so that the intermediate minimum is much higher than the intermediate maximum. If the load impedance generally matches the range of low image impedances, the filter exhibits an insertion loss-frequency characteristic that transmits only one effective bandpass.

For obtaining specific responses additional spaced, mass loaded electrode pairs forming resonators are added between the other pairs.

In such devices, using two or more resonators, the successive resonators generally produce the same unwanted inharmonic modes. Thus, they tend to reinforce the same unwanted inharmonic modes. While unwanted modes usually appear 30 decibels or more below the maximum output of these devices, they may nevertheless be undesirable.

In such devices, it is also necessary that the source impedance match the load impedance to achieve the most effectvie or efficient transmission characteristic. Otherwise some type of matching transformer is essential to obtain the minimum insertion losses.

An object of this invention is to improve devices of this type described in the beforementioned copending applications, particularly by eliminating these disadvantages.

A particular object of this invention is to prevent reinforcement of unwanted inharmonic modes by successive resonators.

Still another object of the invention is to eleminate the need for impedance matching of the two energy paths between which the energy translating device operates, namely, between the source and the load, while nevertheless achieving minimum insertion losses without the use of a separate transforming device.

A specific aspect of this object is to make the energy translating device itself perform as an impedance or voltage transformer.

According to a feature of the invention, these objects are achieved in such selective energy translating devices by making the areas of the plates of one of the resonators different from those of the adjacent resonator and giving the plates of the different resonators masses which shift the resonant frequencies of the individual resonators to the same center frequency and which simultaneously decouple the resonators to an extent determined by the resonators' spacing and the desired energy band to be passed. Preferably, the plate areas of the respective resonators, are such as to match the impedance ratio of the respective resonators to the respective energy paths.

According to another feature of the invention, where the energy paths have equal impedances, unwanted inharmonic mode reinforcement is eliminated in such energy translating devices by furnishing more than two resonators and making the plate area of the intermediate resonator different from the plate areas of the extreme resonators. The individual frequency which the intermediate resonator tunes is adjusted by suitable mass loading.

The impedance of any individual resonator is a function of the electrode area. Furthermore, the electrode dimensions are largely responsible for determining unwanted inharmonic modes. Thus, by varying the electrode area of any resonator it is possible to match a resonator to any specific impedance while at the same time shifting unwanted inharmonic modes in frequency.

Any detuning which occurs as a result of changing electrode areas can be compensated by suitable mass loading. The degree of mass loading is generally measured as plateback. The greater the mass of any pair of plates, the more the plates will lower the frequency of the unplated crystal wafer. In fact, plateback is the percentage frequency decrease of any one resonator from the fundamental thickness shear frequency of the unelectroded wafer as a result of plating.

By virtue of the invention, unwanted inharmonic modes can be effectively suppressed and the device may be made to behave as an impedance and voltage transformer between respective energy paths.

The various features of novelty characterizing the invention are pointed out in the claims. Other objects and advantages of the invention will become known from the following detailed description when read in light of the accompanying drawing wherein:

FIG. 3 is a diagram illustrating the real portions of the image impedance-frequency characteristics for the device of FIGS. 1 and 2;

FIG. 4 is a diagram illustrating the real portions of a sample image impedance-frequency characteristics, for the devices such as in FIGS. 1 and 2 when the resonators are overcoupled;

FIG. 5 is a diagram illustrating the transmission characteristics for the device of FIGS. 1 and 2;

FIG. 9 is a circuit diagram illustrating an alternate embodiment of the device in FIGS. 1 and 2;

Figure 1:
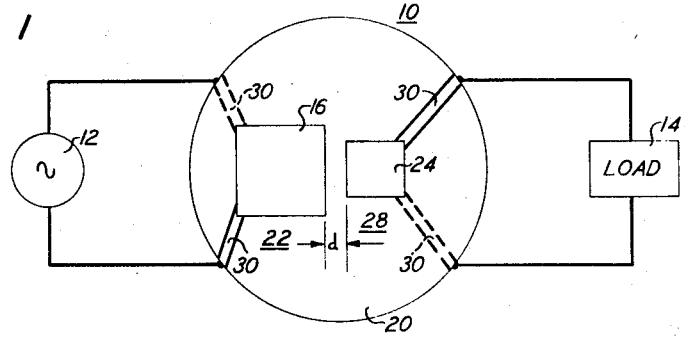
FIG. 1 is a schematic diagram illustrating a circuit wherein an energy transfer device embodying features of the invention appears in a plan view and wherein specifically the device behaves as a filter.
Figure 2:
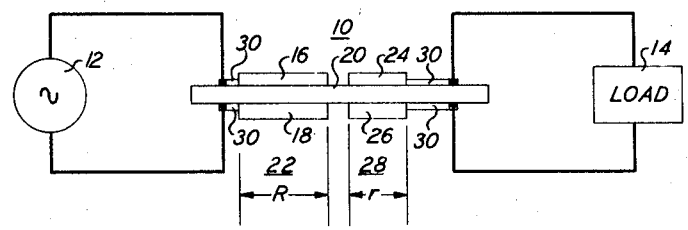
FIG. 2 is a partly schematic diagram of the circuit in FIG. 1 showing a sectional view of the device in FIG. 1.

In FIGS. 1 and 2, a filter 10 embodying features of the invention transmits energy from a source 12 to a load 14. In the filter 10, two rectangular metal electrodes 16 and 18 are vapor-deposited onto opposite faces of an AT-cut quartz crystal wafer 20 to form therewith a first resonator 22. Two other metal vapor-deposited electrodes 24 and 26 whose areas are smaller than the areas of the electrodes 16 and 18 form a second resonator 28 with the wafer 20. Suitable metallic leads 30 also vapor-deposited on the wafer 20 extend to the edges of the wafer where they are connected to the source 12 and load 14. The structure 10 is supported, and connected by conventional means, not shown. The electrodes 16 and 24, and 18 and 26 are aligned along the wafer's Z' crystallographic axis for vibration in the thickness twist mode. They may also be aligned along the X crystallographic axis for vibration in the thickness shear mode.

A distance $d$ separates the plates of the respective resonators 22 and 28. The electrodes 16 and 18 have a length R transverse to the spacing between the resonators. The electrodes 24 and 26 exhibit a length $r$ transverse to the spacing between the electrodes.

In FIG. 1 the dimensions of the electrodes 16 and 18 are such as to make the impedance ratio of the resonators 22 and 28 equal to the ratio of source to load impedance. The masses of the electrodes in each resonator, when considered alone, each lower the resonant frequency from the fundamental thickness shear mode frequency of the unelectroded wafer by .3 to 3 percent to the same desired midband frequency $f_0$. Since different size electrodes affect the tuning slightly, the electrode masses in the two resonators are not the same but the resonant frequencies are the same. Furthermore electrodes 16, 18, 24 and 26 are at once sufficiently massive, and the resonators 22 and 28 spaced sufficiently far apart to establish two separate ranges of image impedances A and B in two respective frequency bands $f_1$ to $f_2$ and $f_3$ to $f_4$, as shown in FIG. 3.

The curves A and B in FIG. 3 represent the image impedance from the source side, the "input" image impedance along an ordinate scale 1. The same curves A and B in FIG. 3 represent image impedance from the output side, the "output" image impedance along an ordinate scale 2. Thus the curves' excursions are substantially identical for input and output image impedances. They only have different ordinate scales. The scales vary inversely with the electrode area of the resonator at which the image impedance is being considered. In FIG. 1 the electrode areas, and the coupling between resonators due to mass loading, and spacing $d$ are such that the peak value $Z_0$ in the curve A on both scales is equal to the load impedance $Z_t$ and the source impedance $Z_s$ respectively. The significance of these parameters is based on the following.

As mentioned in the beformentioned applications, when electrodes such as electrodes 16, 18, 24 and 26, are sufficiently massive, they concentrate the amplitude of thickness vibrations imposed by the source S in the regions of wafer 20 between the electrodes of each resonator 22 and 28 and make the amplitude of vibration in the wafer 20 drop off exponentially as the distance from each resonator increases. By virtue of this mass loading, the edges of the wafer 10 have little effect on operation. By virtue of this mass loading, the coupling between resonators 28 and 22 decreases with an increase in the distance $d$ between resonators.

When the coupling between respective resonators is very tight, due either to small mass loading or small values of $d$, the real portion of the image impedance or the "real" image impedance characteristic formed by the structure 10, or its equivalent circuit, as the frequency increases appears as in FIG. 4. Image impedance $Z_{im}$ looking into either end is the square root of the short circuit and open circuit impedances, namely $\sqrt{Z_{sc} Z_{oc}}$, of the other end. Here $Z_{im}$ as a function of frequency exhibits virtually identical curves looking from either end except that the ordinate scales 1 and 2 differ if the electrode sizes in the resonators differ.

In FIG. 4, in both scales, real portion $R_i$ of image impedances $Z_{im}$ appear in two frequency bands. In each band the image impedance varies from zero to infinity as the frequency increases. The curve shapes are due in part to the residual capacitances of the electrodes 16, 18, 24 and 26. Since any one terminating or input resistance must intersect both curves $R_i$, two equal passbands occur in the transmission characteristic.

In FIGS. 1 and 2, comparable to that disclosed in the copending applications mentioned above, decreasing the coupling by sufficient mass loading or increasing the value $d$ enough to overcome the capacitances of the electrodes produces the two image impedance bands A and B shown in FIG. 3. Here, the image impedance in the lower band varies from zero at a frequency $f_1$ to an intermediate maximum impedance $Z_0$ at a frequency $f_0$ and back to zero at a frequency $f_2$. In the second band the image impedance varies from infinity at a frequency $f_3$ to an intermediate minimum $Z_m$ and back to infinity at a frequency $f_4$. As coupling decreases, $Z_0$ and $Z_m$ the interimpedances $Z_s$ and $Z_t$ match the respective image impedances, grow further and further apart. This occurs for both input and output image impedances.

The transmission characteristics available from the device 10 depends upon how closely the source and load impedances $Z_s$ and $Z_t$ match the respective image impedances looking from the output and input of the device. By connecting the device 10 to a load and source whose impedances match the image impedance at $Z_0$ or the same two points on curve A, the insertion loss at the matching frequencies become substantially zero, or the minimum obtainable. The greater the mismatch, the greater the insertion loss. Since under these circumstances impedances in the second band are remote from the impedance $Z_t$ or $Z_s$, the insertion loss in the band B is high. Thus, the second band is virtually ineffective in establishing the transmission characteristic. This ineffectiveness prevails so long as the values $Z_t$ and $Z_s$ are less than or only slightly larger than $Z_0$. In the beforementioned applications, the values of $Z_s$ and $Z_t$ were considered identical or the loss from the resulting mismatch was accepted.

In practice, it is the values of $Z_0$ which are made to have a specific relation to the value of $Z_t$ and $Z_s$. This is done by varying the coupling. The smaller the coupling the smaller are the bands between $f_1$ and $f_2$ and between $f_3$ and $f_4$ and the smaller is the value of $Z_0$. $Z_m$ increases in these circumstances. In order to obtain coupling that furnishes minimum insertion loss it is necessary that the value of the source impedance $Z_s$ have the same relation to $Z_0$ when considered from the output end as has the value $Z_t$ to $Z_0$ when considered from the input end. For example, in one embodiment $Z_s$ equals $Z_0$ on one ordinate scale and $Z_t$ equals $Z_0$ on the other ordinate scale. A sample transmission characteristic for the conditions shown in FIG. 3 for $Z_t = Z_0$ on scale 1 and $Z_s = Z_0$ on scale 2 appears in the two solid curves of FIG. 5. The curve B in FIG. 5 is for a magnified frequency scale. If a mismatch occurs the transmission characteristic appears as shown by the broken curve of FIG. 5 which blends into the solid curve. The additional loss is due to the impedance mismatch.

Generally, according to the invention the areas of the plates of the resonator 22 are made large enough so that the resonator matches the impedance of the source 12. They are also mass-loaded between .3 and 3 percent to tune to a desired frequency $f_0$. Similarly, the areas of plates 24 and 26 in resonator 28 are made large enough to match the load impedance. The mass of the electrodes 24 and 26 is then made large enough to tune the resonator 28 to the same frequency as the resonator 22. By tuning to the same frequency here is meant tuning to the frequency of that resonator alone, or while completely uncoupled from the other resonator.

The specific manner in which the device 10 is constructed may best be understood by considering the steps of making such a device. The principles of the invention are generally applied for manufacturing a filter to a given bandwidth BW about a chosen frequency $f_0$ between two given impedances $Z_s$ and $Z_t$. This is done by first selecting a suitable plateback percentage within which to start operating. The percentage plateback $P_B$ for any one resonator is the percentage frequency decrease of the rsonant frequency from the fundamental thickness shear frequency of the unelectroded wafer as a result of electroding. Suitable plateback percentages vary from .3 to 3 percent. Plate back can also be measured as the decrease from a thickness shear, or twist, overtone mode of an unelectroded wafer as the result of electroding. After a suitable plateback is selected for one resonator, the index frequency from which the crystal is to be cut for the particular plateback is selected. This index frequency may be the thickness shear mode fundamental frequency. The latter is determined as follows:

$$P_B = \frac{f - f_0}{f}$$

Hence $$f = \frac{f_0}{1 - P_B}$$

The manufacture proceeds by cutting a wafer 20 from a quartz crystal having the desired crystallographic orientation such as an AT-cut. The wafer is then lapped and etched to a thickness $t$ corresponding to an index shear mode frequency $f$ that exceeds the desired frequency $f_0$ by the selected plateback value between .5 percent and 3.5 percent. Generally, the thickness is inversely proportional to the desired frequency.

A mask is then cut to vapor-deposit the electrodes 16, 18, 24 and 26. The areas $A_0$ and $A_n$ of the electrodes 16 and 18 and the electrodes 24 and 26 are determined by considering the desired bandwidth BW, the desired source impedance $Z_s$, the desired terminating impedance $Z_t$ and the desired center frequency $f_0$, from the formulas:

$$A_0 = \frac{2\pi BW K_x}{f_0^3 Z_s}$$

$$A_n = A_o \sqrt{\frac{Z_t}{Z_s}}$$

where $K_x$ varies between 1.8 for rectangular electrodes and 1.9 for circular electrodes depending on the freqency range. These areas are used by making the electrodes square, although other rectangular shapes may be used.

A convenient separation $d$ between the electrodes is chosen to cut the mask. It may be chosen on the basis of the graphs of FIGS. 6, 7 and 8 which show variations in percent bandwidth for various ratios of electrode separation to plate thickness and for various platebacks as well as various values of $r/t$ in typical crystal structures.

Figure 6:
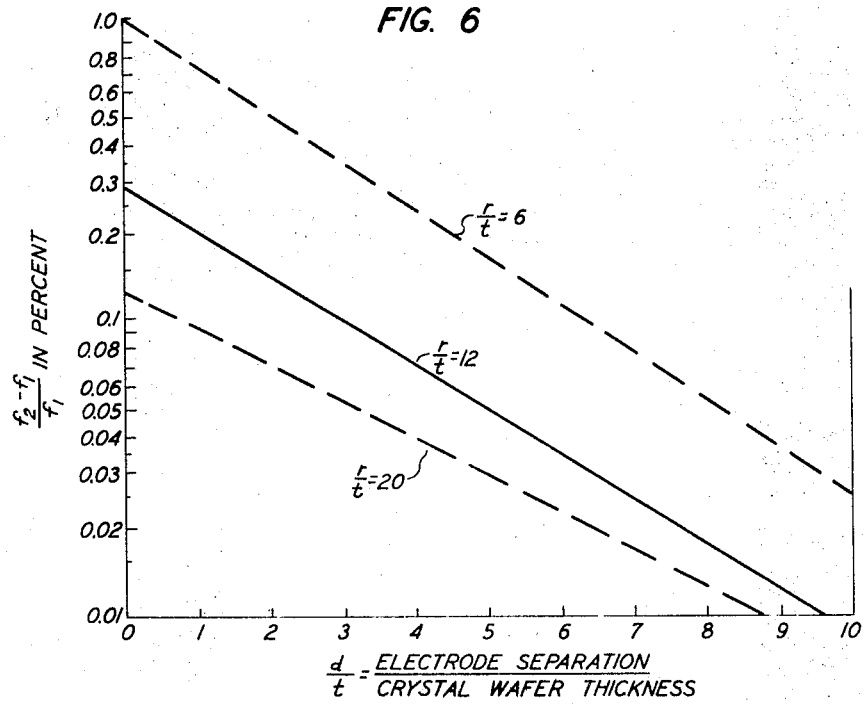
FIGS. 6, 7 and 8 are diagrams illustrating the relationships of various dimensions of devices such as in FIGS. 1 and 2 to the operation of these devices.
Figure 7:
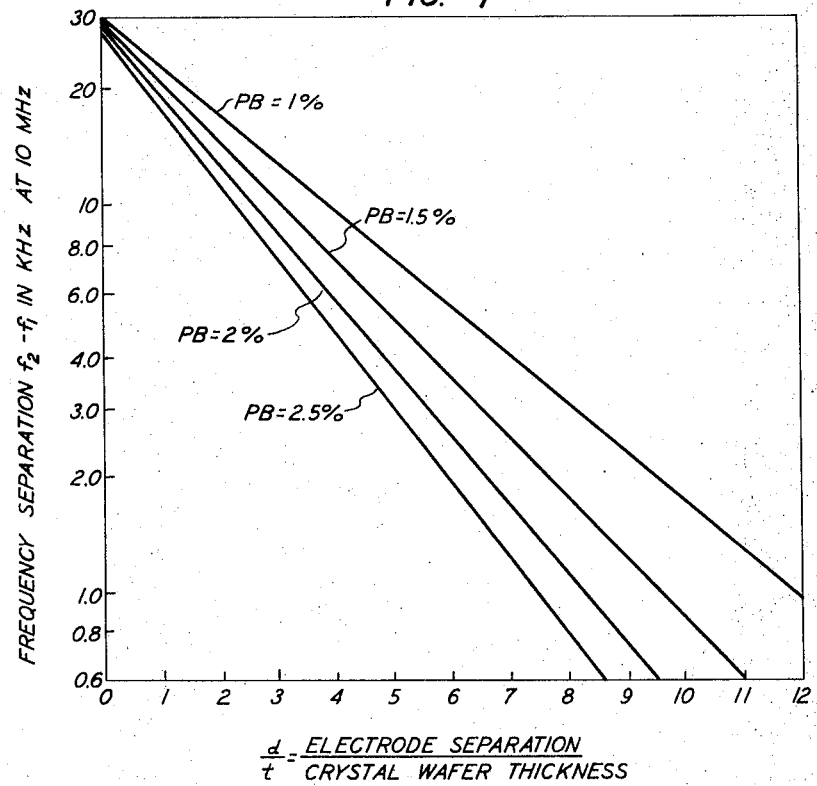
Figure 8:
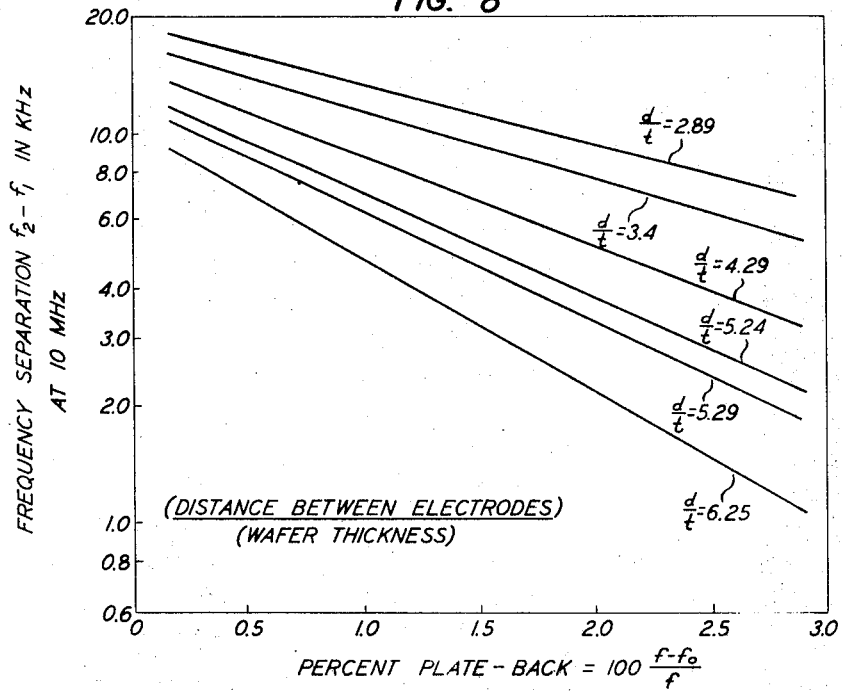

The curves of FIGS. 6, 7 and 8 were developed from sample crystal structures tuned to amplify 10 megacycles for obtaining particular frequency separations about a 10-megacycle center frequency. Unless the ripples in the passband are critical, variations in the value of $d$ are permissible.

A mask with cutouts for electrodes of the determined dimensions now covers the wafer. To obtain the chosen platebacks, gold is deposited through the mask in very light layers so as to make connections possible. Energy is applied to the first pair of electrodes in the first resonators and mass added, that is gold is added by vapor deposition, until a frequency shift to $f_0$ corresponding to the selected plateback occurs. Gold is now deposited for the other electrode pair or second resonator. At the same time, the passband about $f_0$ is observed. Gold mass is added until the desired passband BW is achieved. This desired bandwidth should then prevail with a center frequency of $f_0$.

Because of the empirical nature of some of the formulae, an initial sample may not exhibit the center frequency $f_0$. In that case, subsequent devices should be made from wafers whose thickness is based on a new index frequency that differs from the original index frequency by the correction required in the center freqency $f_0$.

According to the invention, the electrodes may be deposited as shown in FIG. 9 wherein the electrodes 16 and 24 correspond with those of FIGS. 1 and 2 and wherein an electrode 36 performs the function of the electrodes 18 and 26. In this case, since the mass of the electrode 36 is uniform and spread over the areas occupied by the electrodes 16 and 24 on the opposite side of the wafer, the mass loading of the resonator 28 composed of the electrode 24 and part of the electrode 36 is borne largely by the electrode 24.

By virtue of this invention, the impedance of the resonator 22 matches the impedance of the source 12 and the impedance of the resonator 28 matches the impedance of the load 14. Thus, no external impedance transformers are necessary to avoid impedance mismatch losses.

By virtue of the invention, impedances are matched to sources and load in the manner of a transformer. Furthermore, since the resonator 22 and the resonator 28 each produce different unwanted inharmonic modes, the tendency of the filter is to eliminate these modes rather than to emphasize them.

The value $Z_0$ need not actually equal the source and load impedances $Z_s$ and $Z_0$ for the particular scales of the ordinate in FIG. 4. They may, for example, fall equally above or below the source and load impedances. In that case, however, the resulting insertion loss characteristic will have a single minimum if the value $Z_0$ is less than the values of impedances in the source and load which is higher in FIG. 5, as shown by the dotted line. On the other hand, if the value of $Z_0$ appears as shown in FIG. 3, the transmission characteristic will be slightly flatter and show a double hump.

Figure 10:
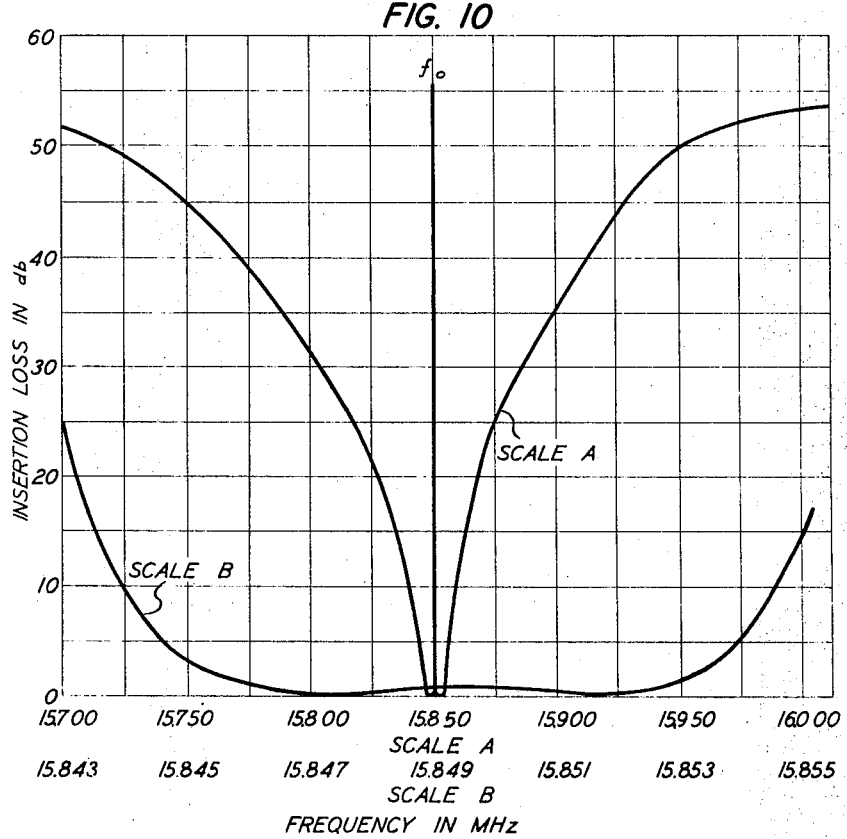
FIG. 10 is a diagram illustrating a transmission characteristic of the device such as shown in FIG. 9 when properly terminated.

FIG. 10 illustrates the insertion loss characteristic for the structure of FIG. 9 when the latter had the following characteristics. These characteristics are given as an example only.

$f_0 = 14.848250$ mHz.
$f_1 = f_A = 14.853773$ mHz.
$f_2 = f_B = 14.843970$ mHz.
$d = 0.012$ inch.
$A_{e1} = .0248$ sq. inch.
$A_{e2} = .0038$ sq. inch.
$P_{B1} = \sim 2\%$.
$P_{B2} = \sim 2\%$.
$Z_s = 1260$ ohms.
$Z_v = 194$ ohms.
$t = .00414$ inch.

The electrode pairs 22 and 28 were aligned along the Z′ crystallographic axis.

Figure 11:
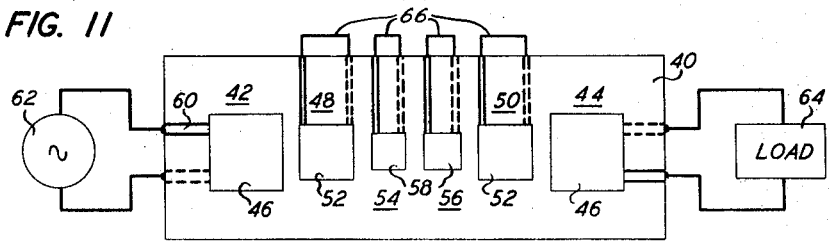
FIG. 11 is a circuit diagram including in schematic plan view another energy transfer device embodying features of the invention.
Figure 12:
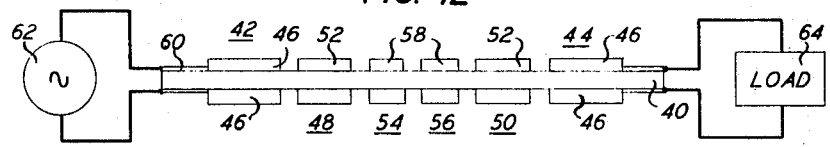
FIG. 12 is the circuit of FIG. 11 showing the energy transfer device in elevation.

The unwanted inharmonic mode cancellation advantages obtainable from the impedance transformation of FIGS. 1, 2 and 9 are available also for devices wherein the input and output impedances are equal. This is accomplished by placing an intermediate resonator between the extreme resonators with electrode sizes differing from those of the electrodes in the extreme resonators. Several such intermediate resonators of different sizes are possible. This structure is most suitable for multimode resonators as shown in FIGS. 11 and 12. Here, a crystal wafer 40 carries two extreme resonators 42 and 44 having electrodes 46 of equal size. Intermediate resonators 48 and 50 have electrodes 52 equal to each other but differing from electrodes 46. Further intermediate resonators 54 and 56 have electrodes 58 which are equal to each other, but differ from electrodes 52 and 46. Suitable means 60 connect the extreme resonators to a source 62 and the load 64.

These multimode resonators are constructed in accordance with the principle of the invention by decoupling them sufficiently with enough mass loading and spacing and as outlined in the beforementioned copending applications. Each of the resonators are tuned to the same frequency $f_0$ when considered in the uncoupled state. They are sufficiently decoupled by mass loading and spacing so that their coupled resonant frequencies are all lower than the lowest existing antiresonant frequency and so as to establish a passband in a limited impedance range. Their insertion loss, i.e., transmission characteristics generally form slight ripples. The number of ripples generally equals the number of resonators.

In FIG. 11 suitable means 66 establish short circuits across the intermediate resonators 48, 50, 54 and 56. The need for these short-circuiting means arises because effectively uncoupling the individual resonators and tuning them by vapor deposition to the frequency $f_0$ is easiest when they are connected in a low impedance bridge or in a low impedance transmission circuit. However, the low impedances severely reduce the capacitive effect of the resonator electrodes and thus affect their tuning. Thus, to emulate the tuning of the resonators with low impedance devices, short circuits are used. If the resonators are properly tuned without short circuits they can remain open.

The short circuits serve an additional purpose. They prevent capacitive feedthrough of the signals from adjacent electrodes on the same face of the crystal wafer. They behave as protective shields. In this way they also reduce unwanted inharmonic modes.

Figure 13:
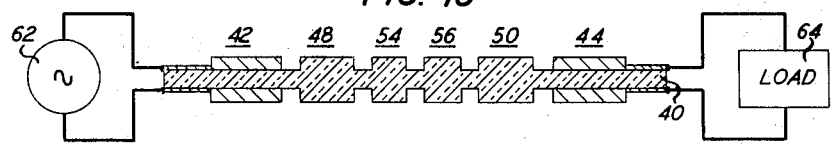
FIG. 13 is a circuit diagram illustrating another embodiment of the invention.

The electrodes in the intermediate resonators 48, 54, 56 and 50 need not actually be metallic since no piezoelectric effect is necessary for their operation. In fact, they may actually be formed by etching the wafer 40 as shown in FIG. 13. In that case short circuits are necessary only if the thus-formed means are capped with thin layers of gold for measurements.

The specific terms thickness shear mode and thickness twist mode have been used herein. Vibrations in the former occur when the electrodes are aligned along the X crystallographic axis. Vibrations in the latter occur when the electrodes are aligned along the Z′ crystallographic axis. However, the term thickness shear mode is used also in its more general sense to include both these modes as set forth in the McGraw-Hill Encyclopedia of Science and that publication the two specific modes thickness shear and thickness twist are distinguished from each other with designations such as the thickness shear mode with $m=1$, $n=1$, $p=1$, and the thickness shear made wherein $m=1$, $n=1$, and $p=2$.

While embodiments of the invention have been described in detail, it will be obvious to those skilled in the art that the invention may be embodied otherwise within its spirit and scope.

What is claimed is:

1. An energy transfer device comprising an acoustically resonant wafer excitable in the thickness shear and thickness twist modes and having opposing surfaces, first plate means including a pair of plates on opposite surfaces of said wafer, second plate means including a pair of plates on opposite surfaces of said wafer; said plate means each having masses sufficient to concentrate thickness shear and twist vibrations of said wafer, when the wafer is excited, in the portion of said wafer between said plates and to make the vibratory energy decrease exponentially in portions of the wafer away from said plates; the masses of said plates and the distance between said plate means being great enough so as to decrease the acoustic coupling between said plate means below a given value, the area of one of the plates in one of said plate means being greater than the area of one of the plates in the other of said plate means.

2. An energy transfer device as in claim 1, wherein at least one of said plate means are composed of metallic electrodes, and wherein each of said plate means have two opposing rectangular plates.

3. An energy transfer device as in claim 1 comprising additional plate means corresponding to said first and second plate means and spaced therefrom so that the coupling between said additional plate means and at least one of said other plate means is also below said given value.

4. An energy transfer device as in claim 1 comprising additional plate means aligned with said first and second plate means, the area of one of said plates in said additional plate means being different than the areas of said ones of said plates, said ones of said plates being arranged so that said areas vary in descending and then ascending order.

5. An energy transfer device as in claim 4, wherein said plates are metallic and form electrodes.

6. An energy transfer device as in claim 5, wherein one plate means having the largest plates form input electrodes and wherein the plate means having plates equal to the largest plates form output electrodes.

7. A device as in claim 1, wherein said plates are each conductive; and wherein the acoustic coupling between said plate means is low enough so that said plate means and said wafer exhibit a real image impedance-frequency characteristic that starts at zero, increases to a finite value, decreases to zero, begins again at a substantially infinite value, decreases to a second finite value at least twice as high as the first value, and increases to a substantially infinite value.

8. A device as in claim 1, wherein said wafer is a single-crystal piezoelectric wafer.

9. An energy transfer device comprising an acoustically resonant wafer cut for vibration in the thickness shear and thickness twist modes, said wafer having a characteristic frequency depending upon its thickness, said wafer having opposing surfaces, a first region within said wafer with a thickness different from said wafer and exhibiting a frequency different from the characteristic frequency, a second region in said wafer having a thickness different from said wafer and exhibiting a frequency different from said characteristic frequency, said first and second regions being bounded near one of said surfaces by specific bounds so as to form specific areas at said surface; said regions being sufficiently different in thickness from the thickness of said wafer so as to concentrate thickness shear and twist vibrations of said wafer, when the wafer is excited, in the portion of said wafer of said regions and to make the vibratory energy decrease exponentially in the portions of the wafer outside of said regions; said regions being spaced from one another and being spaced from the edges of said wafer, the thicknesses of said regions being sufficiently different from that of said wafer, and the distance between said regions being great enough so as to decrease the acoustic coupling between said regions below a given value, said areas bounding said regions at the one of the surfaces being greater than the area of the other, whereby the impedance of one of said regions is greater than the other.

10. A device as in claim 9, wherein said regions each includes conductive portions; and wherein the coupling between said regions is low enough so that said regions with their conductive portions exhibit a real image impedance-frequency characteristic that starts at zero, increases to a finite value, decreases to zero, begins again at a substantially infinite value, decreases to a second finite value higher than the first finite value, and increases to a substantially infinite value.

References Cited

UNITED STATES PATENTS

| | | | |
|---|---|---|---|
| 2,345,491 | 3/1944 | Mason | 333—72 |
| 2,969,512 | 1/1961 | Jaffee et al. | 333—72 |
| 3,015,789 | 1/1962 | Honda et al. | 333—72 |

HERMAN KARL SAALBACH, Primary Examiner

T. J. VEZEAU, Assistant Examiner

U.S. Cl. X.R.

310—1.8; 333—32